March 16, 1926.  
R. L. GRUSS  
1,577,253
MOUNTING FOR VEHICLE AIR SPRINGS AND THE LIKE
Filed Nov. 6, 1923   2 Sheets-Sheet 1
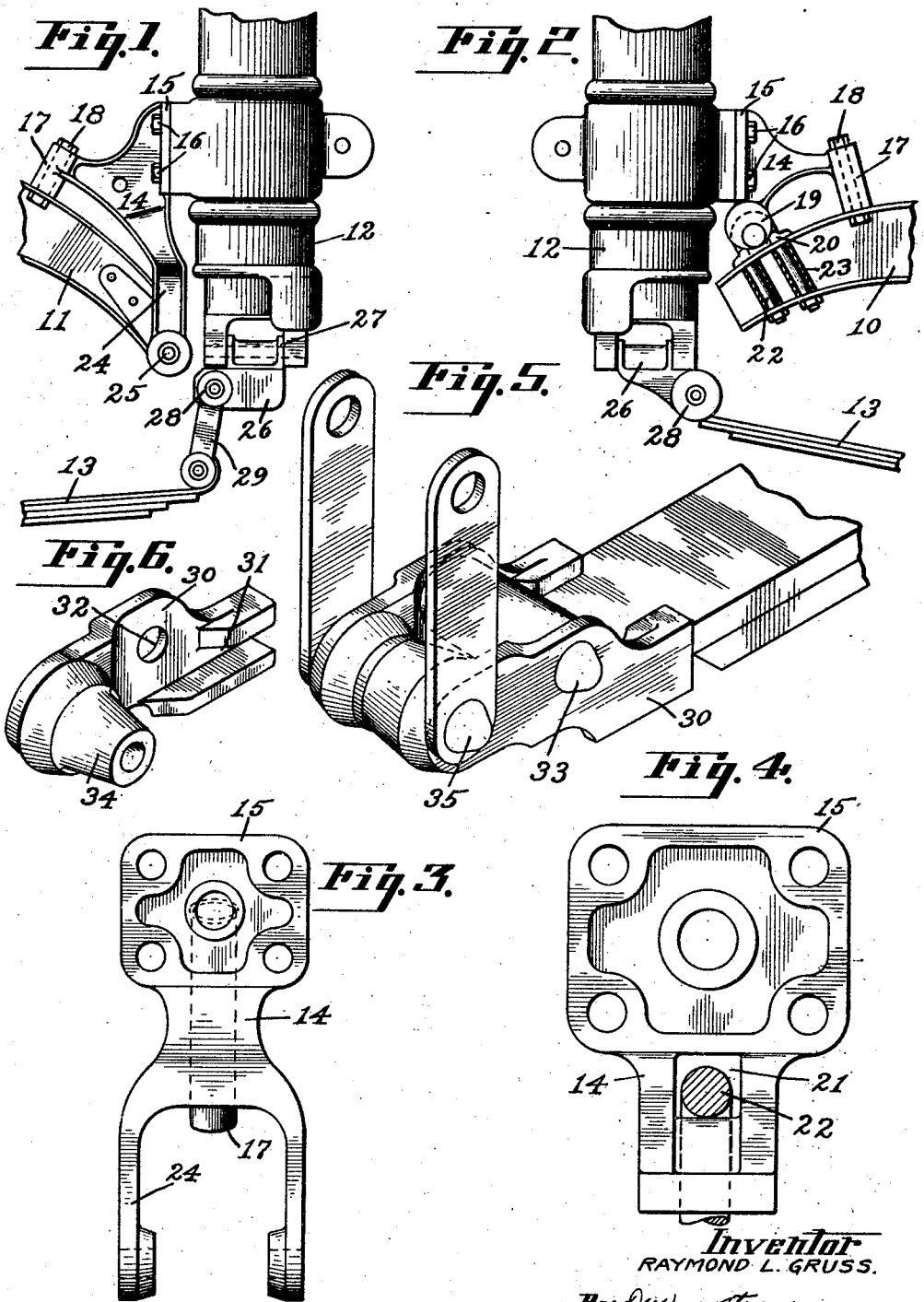
Inventor  
RAYMOND L. GRUSS.

March 16, 1926.  1,577,253
R. L. GRUSS
MOUNTING FOR VEHICLE AIR SPRINGS AND THE LIKE
Filed Nov. 6, 1923  2 Sheets-Sheet 2
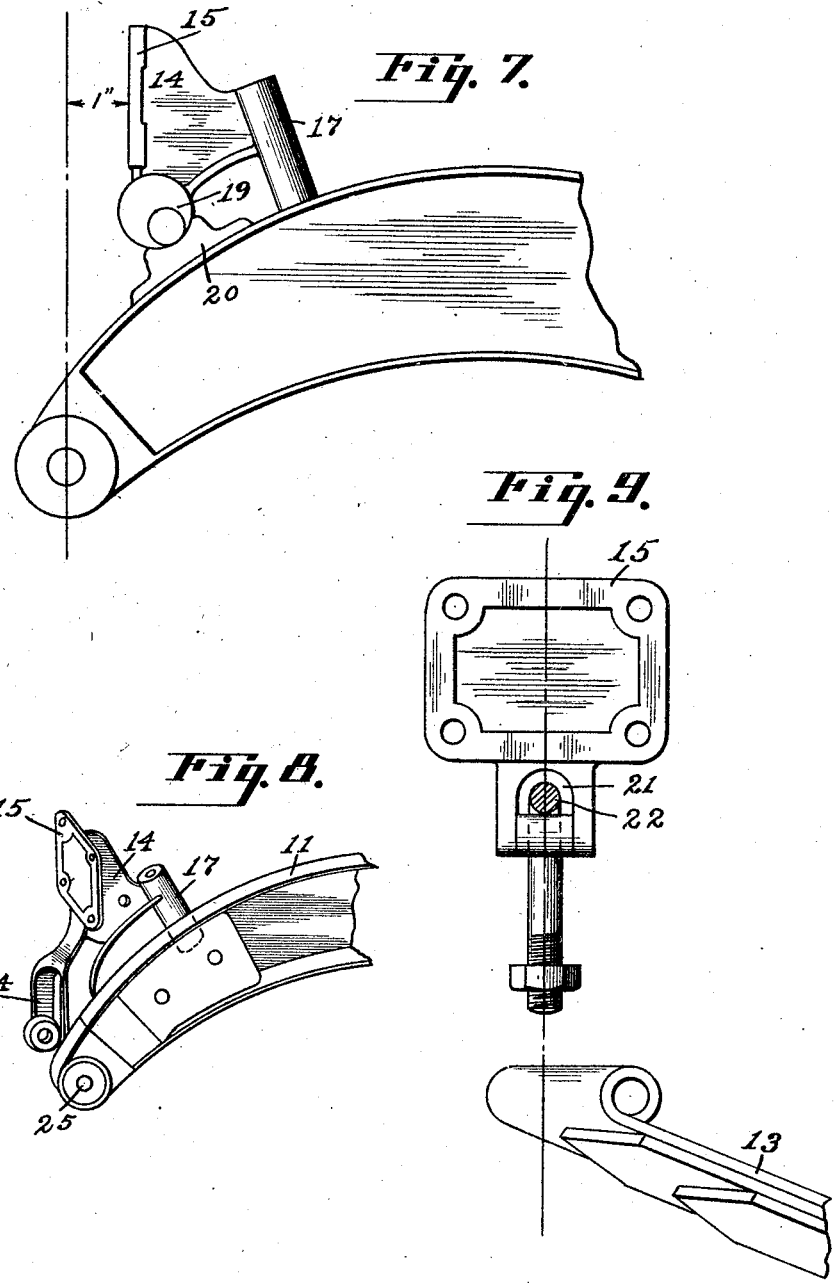
Inventor
RAYMOND L. GRUSS.

Patented Mar. 16, 1926.

1,577,253

UNITED STATES PATENT OFFICE.

RAYMOND L. GRUSS, OF SAN FRANCISCO, CALIFORNIA, ASSIGNOR TO GRUSS AIR SPRING CO., OF SAN FRANCISCO, CALIFORNIA.

MOUNTING FOR VEHICLE AIR SPRINGS AND THE LIKE.

Application filed November 6, 1923. Serial No. 673,085.

*To all whom it may concern:*

Be it known that I, RAYMOND L. GRUSS, citizen of the United States, residing at San Francisco, county of San Francisco, and State of California, have invented new and useful Improvements in Mountings for Vehicle Air Springs and the like, of which the following is a specification.

This invention relates to a mounting for telescopic air springs and the like, such as are interposed between the usual leaf springs and the frame of the vehicle.

The object of this invention is to provide a simple and inexpensive mode of mounting telescopic springs of the type mentioned at the front and rear ends of the vehicle frame, and to provide standardized brackets or facing means for the air springs which will be applicable to a variety of sizes and shapes of vehicle frames, thereby reducing the number of parts and different styles of brackets required to be carried in stock by the installer.

A further object is to design and construct these brackets or facing means so that there will be but one shape for the front and one for the rear of the vehicle—that is to say, one style may be used for either the right or left hand side of the frame.

It is of the utmost importance in the installation of air springs to secure the proper location for the bracket which supports the air spring, to the end that the center of the air spring will be brought into proper working position relative to the end of the leaf spring. This is particularly true of the front end of the vehicle, where no shackle is used between the leaf spring and the air spring. In and by the present invention the brackets which carry the air springs, although of standardized form, are so constructed and connected to the vehicle frame as to readily insure proper positioning of the air spring, regardless of variations in size, shape or curvature of the side bars of the vehicle frame.

In the accompanying drawings,

Fig. 1 shows a side elevation of an air spring installation embodying my invention;

Fig. 2 shows a side elevation of a front spring installation in accordance with my invention;

Fig. 3 shows a face view of the bracket used in the rear installation;

Fig. 4 shows a face view of the bracket used in the front installation;

Fig. 5 shows a perspective of extension plate sometimes used in connection with the rear installation;

Fig. 6 shows a perspective of one of the side members of the extension plate of Fig. 5;

Fig. 7 shows a side elevation of the front end of a vehicle frame with a bracket in place thereon, illustrating the correct mode of locating the bracket;

Fig. 8 shows a perspective view of the rear end of a vehicle frame with a bracket temporarily in place thereon for determining its proper position;

Fig. 9 shows a diagram illustrating the correct position of the bracket in relation to the leaf spring, viewing the latter in end elevation.

Referring more in detail to the accompanying drawings, 10 indicates the front end of the side bar of a vehicle frame; 11 the rear end. A telescopic air spring of well-known construction is indicated generally at 12, being mounted upon the frame bar of the vehicle and connected at its lower end to the usual leaf-spring 13.

The mounting for the air spring comprises a bracket 14 formed with an upstanding face plate 15, to which the air spring is secured by means of bolts 16. Extending rearwardly from this face plate and overlying the side bars of the vehicle frame is a boss 17 adapted to be secured to the top of the side bar by means of a vertically extending bolt 18 passing through an opening in the boss and through an opening in the top flange of the channel bar frame member.

In the case of the front installation the usual goose-neck extension of the frame bar is removed, and the bracket which carries the air spring has a downward extension 19, resting on a saddle 20, on top of the frame bar. This downward extension 19 has an enlarged opening 21, in which is positioned a U-bolt 22, said U-bolt extending through openings in the flanges of the channel bar frame member and secured in place by the use of nuts and spacing sleeves 23.

The bracket for the rear installation has a downward extension 24 which is forked, as shown in Fig. 3, so as to straddle the rear end of the side bar of the frame. The ends of these forked members are connected to the eye in the end of the frame bar by means of a pin 25.

The lower end of each air spring carries a pivot block 26 which affords a wrist-joint connection with the leaf spring. The said block includes a bearing 27 which connects with the air spring on a pivot extending longitudinally of the vehicle, and a bearing 28 below the said bearing 27 and to one side thereof which forms a pivotal connection with the leaf spring upon a transverse axis. In the case of the front installation the eye of the leaf spring connects directly with the said pivot block, whereas in the rear installation, a shackle 29 is interposed between the leaf spring and the said pivot block. I prefer in general to make use of the original shackles and spring pins for connecting the leaf springs to the air springs.

In certain cars I have found that the shackle 29 will incline too far from the vertical position when connected to the air spring, and where this condition is encountered I make use of the extension plates shown in Fig. 5 and Fig. 6. This device includes right- and left-hand plates or blocks 30, provided at one end with channels 31 to fit over the spring leaves. Intermediately at the ends of each plate or block there is an opening 32 to receive a pin 33 passing through the eye of the leaf spring. At their outer ends the blocks or plates have telescoping bosses 34 which are apertured to receive a pin 35 for connecting the shackle in place. In this manner the necessary length is added to the leaf spring to bring the shackle into a substantially vertical position where it will operate as originally intended.

The brackets of the present invention are made in standard sizes with the boss portion 17 sufficiently long to bring the face plate 15 into perpendicular position even in extreme cases where there is comparatively little curvature or drop to the end of the frame bar. Therefore, in many instances it is necessary to cut the bottom of the boss away more or less, in order to properly position the bracket. It will be understood that the proper position for the bracket in the case of the front elevation is as shown in Fig. 7, where the face plate of the bracket is in a vertical position and is spaced about one inch to the rear of a vertical line drawn through the center of the eye in the front end of the side bar. The proper position for the bracket having been located, the side bar is marked where holes are to be drilled, and the lower end of the boss 17 is marked where it is necessary to cut it off, in order to bring the face plate into perpendicular position. The usual goose-neck extension at the front end of the frame bar is now removed, in order to allow proper clearance and working range for the air spring.

After the holes are drilled for the facing it is important to make sure that the center of the face-plate is on a line with the middle line of the leaf spring, as shown in Fig. 9. Should there be any misalignment in the frame shown in Fig. 9 the bracket may be shoved slightly to one side or the other, by reason of the fact that the opening 21 for the U-bolt 22 is considerably enlarged. This would also compensate for any off-set in the leaf spring.

To facilitate marking and alignment of the bracket in the rear installation it is recommended that the bracket be temporarily attached to the frame bar as shown in Fig. 8. By so doing the bracket can be moved angularly until the proper position of the face plate is arrived at, thence the lower end of the boss can be marked for cutting.

It will be noted that while the specific designs of the front and rear brackets necessarily differ, they are alike to the extent that each has a vertically disposed face plate, a rear extension terminating in a boss, and a downward extension, which latter is so connected with the frame bar as to permit angular adjustment or movement of the bracket in a vertical plane longitudinally of the frame bar. Also in each instance the length of the boss determines the correct positioning for the face plate of the bracket, and this length can be varied either by cutting off the boss when it is too long or placing shims beneath the same in the event it should be too short. Also, both front and rear installations make use of a similar type of pivot block which affords a wrist-joint action between the air spring and the leaf spring, thus compensating for the necessary movements between the air spring and the leaf spring due to twistings and strains incident to the operation of the vehicle.

Various changes in the construction and arrangement of the several parts herein shown and described may be employed, without departing from the spirit of my invention as shown in the appended claims.

Having thus described my invention, what I claim and desire to secure by Letters Patent is:

1. In a vehicle suspension wherein a telescopic air spring is interposed between the usual leaf spring and frame at the ends of the latter, a mounting for the telescopic spring, comprising a bracket having a connection with the end of the vehicle frame bar permitting angular movement of the bracket in a vertical plane longitudinally of the vehicle, a vertically disposed face plate on the bracket to which the telescopic spring is connected an extension on the back of the face plate terminating in a boss to rest upon the top of the frame bar, said boss being of a length to bring the face plate of the bracket into a perpendicular position, fastening means between the boss and the frame bar, and a connection between the leaf spring and the air spring.

2. In a vehicle suspension wherein a telescopic air spring is interposed between the usual leaf spring and frame at the ends of the latter, a mounting for the telescopic spring, comprising a bracket having a connection with the end of the vehicle frame bar permitting angular movement of the bracket in a vertical plane longitudinally of the vehicle, a vertically disposed face plate on the bracket to which the telescopic spring is connected, an extension on the back of the face plate terminating in a boss to rest upon the top of the frame bar, said boss being of a length to bring the face plate of the bracket into a perpendicular position, fastening means between the boss and the frame bar, and a connection between the leaf spring and the air spring, said last-named connection including a pivot block having a wrist-joint action.

3. In a vehicle suspension wherein a telescopic air spring is interposed between the usual leaf spring and the vehicle frame at the ends of the latter, a mounting for the air spring comprising a bracket formed with a vertically disposed face plate, an extension on the bracket behind the face plate, terminating in a boss resting upon the top of the frame bar and formed with a vertical aperture to receive a bolt for fastening it in place, said bracket also having a downward extension and means for securing the extension to the end of the frame bar.

4. In a vehicle suspension wherein a telescopic air spring is interposed between the usual leaf spring and the vehicle frame at the ends of the latter, a mounting for the air spring comprising a bracket formed with a vertically disposed face plate, an extension on the bracket behind the face plate, terminating in a boss resting upon the top of the frame bar and formed with a vertical aperture to receive a bolt for fastening it in place, said bracket also having a downward extension and means for securing the extension to the end of the frame bar, said downward extension in the case of the front bracket being formed with an aperture extending transversely of the face plate, a saddle on which the extension rests, and a U-bolt extending through the aperture in said extension, securing the same to the frame bar.

5. In a vehicle suspension wherein a telescopic air spring is interposed between the usual leaf spring and the vehicle frame at the ends of the latter, a mounting for the air spring comprising a bracket secured to the frame bar and having a vertically disposed face plate to which the air spring is secured, and communicating means between the air spring and the leaf spring, including a pair of clamping plates on the end of the leaf spring, held in place thereon by a bolt fastened through the eye of the spring, telescopic bosses on the projecting ends of the clamping plates formed with transverse openings, and a pair of shackle-bars pivotally connected to said bosses.

6. In a vehicle suspension wherein a telescopic air spring is interposed between the usual leaf spring and the vehicle frame at the ends of the latter, a mounting for the air spring comprising a bracket having a vertical face plate to which the air spring is secured, arms on the bracket, one extending rearwardly of the face plate and the other extending downwardly, means for fastening the downward extension to the vehicle frame so as to permit of angular adjustment of the face plate, the rearward extension terminating in a boss to rest upon the top of the frame bar, said boss being adapted to be cut or shimmed so as to bring the face plate into the desired position, and means extending vertically of the boss, for securing it to the frame bar.

7. In a vehicle suspension wherein a telescopic air spring is interposed between the usual leaf spring and the vehicle frame, a mounting for the air spring comprising a bracket secured to the frame bar, and to which the air spring is rigidly secured, and connecting means between the leaf spring and air spring, comprising a pivot block pivoted to the eye of the leaf spring and extending out therefrom and terminating in a bearing having an opening extending longitudinally of the leaf spring, and a pivot pin in said bearing connecting the latter to the air spring.

RAYMOND L. GRUSS.